United States Patent
Sato (10) Patent No.: US 9,135,464 B2
(45) Date of Patent: Sep. 15, 2015

(54) SECURE STORAGE SYSTEM FOR DISTRIBUTED DATA

(75) Inventor: Paulo Vitor Sato, Campinas-SP (BR)

(73) Assignee: SAMSUNG ELECTRÔNICA DA AMAZÔNIA LTDA., Campinas-São Paulo (BR)

( * ) Notice: Subject to any disclaimer, the term of this patent is extended or adjusted under 35 U.S.C. 154(b) by 0 days.

(21) Appl. No.: 13/339,068

(22) Filed: Dec. 28, 2011

(65) Prior Publication Data

US 2013/0173916 A1 Jul. 4, 2013

(51) Int. Cl.
*H04L 29/06* (2006.01)
*G06F 21/62* (2013.01)
*H04L 9/08* (2006.01)

(52) U.S. Cl.
CPC ............ *G06F 21/6218* (2013.01); *H04L 9/085* (2013.01); *G06F 2221/2107* (2013.01)

(58) Field of Classification Search
CPC ....... H04L 29/06673; H04L 9/00; H04L 9/14; H04L 29/06666; G06F 2211/008
USPC ................................ 713/165; 726/26–28, 30
See application file for complete search history.

(56) References Cited

U.S. PATENT DOCUMENTS

| | | | |
|---|---|---|---|
| 6,789,195 B1 * | 9/2004 | Prihoda et al. | 713/182 |
| 8,527,555 B2 * | 9/2013 | Benitez et al. | 707/805 |
| 2002/0199118 A1 * | 12/2002 | Yardley et al. | 713/201 |
| 2004/0109569 A1 * | 6/2004 | Ellison et al. | 380/277 |
| 2008/0083036 A1 * | 4/2008 | Ozzie et al. | 726/27 |
| 2010/0299313 A1 * | 11/2010 | Orsini et al. | 707/652 |
| 2011/0165896 A1 * | 7/2011 | Stromberg et al. | 455/466 |
| 2012/0198228 A1 * | 8/2012 | Oberheide et al. | 713/155 |

* cited by examiner

*Primary Examiner* — Esther B Henderson (57) ABSTRACT

The present invention relates to a system for distributed data storage that ensures the safety of the user data. In particular, the system of the present invention provides that the data stored in a cloud storage service are encrypted and their cryptographic keys are created from a remote device. In the context of the present invention, cloud is a set of servers that form an online service over the Internet, these servers are invisible to the user of the service pretending they form only a single server, thus forming a "cloud servers". These keys will be divided and stored in cloud storage part and part on other devices.

2 Claims, 7 Drawing Sheets

SECURE STORAGE SYSTEM FOR DISTRIBUTED DATA

FIELD OF THE INVENTION

The present invention relates to a system for distributed data storage that ensures the safety of the user data. In particular, the system of the present invention provides that the data stored in a cloud storage service are encrypted and their cryptographic keys are created from a remote device. In the context of the present invention, cloud is a set of servers that form an online service over the Internet, these servers are invisible to the user of the service pretending they form only a single server, thus forming a "cloud servers". These keys will be divided and stored in cloud storage part and part on other devices.

BACKGROUND OF THE INVENTION

While a mobile device is personal, unexpected situations can occur, such as loss or theft of the same. If this device has any sensitive or confidential information, it might be disclosed or lost.

To ensure that such information is not lost, it would be necessary some kind of redundancy, for example, to keep a copy on a local hard drive and the other in a remote location accessible over the Internet. However, storing sensitive data in online servers also poses risks, such as the invasion and/or information theft.

Within this context, to increase the degree of information security, this data should be encrypted, both in online copy or in remote device. Thus, even in case of theft or intrusion device of the server, the information itself will not be stolen.

Several security issues are found in the prior art, as detailed below:

Problem 1

One company had a leak portfolio with incalculable loss because one of the employees consulted some company documents on their mobile device, but that device was stolen while he was at a bar or other public place.

Problem 2

The employee of a company using the Wi-Fi network provided by the hotel where he was staying, carries sensitive data that are in online storage. But he paid no attention to the Wi-Fi did not have any kind of encryption. An attacker capturing the packets that travel in the middle of Wi-Fi network can view the data traffic, obtaining thus the information.

Problem 3

Files of a company are exclusively stored in an online service that offers no data encryption. In this case, a group of hackers attacking this service over the Internet is very likely that the company's portfolio is stolen. To minimize the risk of problems of the examples presented above, it is possible to adopt the following improvements for each of these cases, respectively:

Improvement for Problem 1: to use virtual storage (cloud);
    Improvement for Problem 2: to use a data connection encrypted (HTTPS for example);
    Improvement for Problem 3: encrypted storage in the cloud and on the phone;

However, these improvements do not provide a complete solution. Even with the addition of cryptographic techniques in the system other problems still need to be covered, as described below:

Problem 4

A system of online storage with encryption is deployed. In this type of system, controlling of data access is done by means of cryptographic keys. However, as this system uses keys that expire, each time a key expires, the entire file system should be re-encrypted, which, in turn, implies in great data traffic for all users because data stored on devices from other users will be invalid, requiring reloading the data stored in the cloud.

Problem 5

A company hires a group of hackers to steal information from another particular company. This group is one of the employees who have permission to take the documents home. The group, knowing that the mobile device that contains employee information they seek, steals your device. Although sensitive data is encrypted inside the device, hackers knowing the encryption key is stored within it, through a brute force attack on the hard drive of the phone can decrypt the data, thus achieving extract the desired information.

To overcome the above problems, some known solutions can be provided as follows:

Improvement for problem 4: each user has his account, with no need for directory access control, reducing the data traffic.
    Improvement for Problem 5: Division of keys between online storage and device The patent document US2010235630 A1, published on May 20, 2010, holder UNISYS CORPORATION, describes a method and system for protecting data in a data storage network. The method comprises receiving data in a safe place for their respective storage. The method includes dividing the data received by means of cryptographically secure storage blocks in a variety of secondary data, and dividing cryptographic key to access data in a variety of key fragments. The method further includes encrypting each of the variety of data blocks with different keys, implementing a cloud that manages to retain a single IP for its infrastructure and using a secure bridge for communication between client and servers, preventing someone who is capturing the transmission has access to data transmitted. However, the storage protection still has flaws, and can be exploited.

The patent document WO2010057194 published on Sep. 16, 2010, holder: NOVELL, INC., describes a system to provide cloud computing services. This system comprises a cloud computing environment with resources for the data to be managed in the cloud, each load data having an address to the same cloud. Said system works so that a given data load to obtain a key from a first cryptographic key pair, said pair of keys for decrypting encrypted hosted storage within the cloud computing environment. The main purpose of this document is to increase the protection of the data stored in the cloud, using keys to this section by hard drive and dividing the file across multiple disks differently, complicating thus the theft of information in case of theft of the storage disk or theft of one of the keys, however, it is still extremely vulnerable to information theft on the client.

The document CN 201408416 published on Feb. 17, 2010, holder: TSINGHUA TONGFANG CO LTD, describes a mobile storage device with a storage mechanism and division keys. The device comprises an interface unit, a processing and control unit, a cryptographic service unit and a data storage unit. A decryption key used by the storage device is formed by the union of two or more segments of data or generated by an algorithm corresponding to this. Each segment has different forms of data storage and access mechanisms. The device is thus of broad protection provided by the adoption of the division of keys and storage mechanism, causing the device to be highly secure. This document relates to mobile storage devices that store the encrypted data and encryption key in separate pieces, spreading to the storage, hence impeding the theft. But the key is still in the entire device.

The document Wuala BY LACIE available on http://www.wuala.com/ is a commercial system that provides encrypted storage leaving the data encrypted on the client side (device). For this system has focused on several different users using the same cloud, it uses its own encryption and access control. This approach is advantageous for multiple users, but periodically causes the entire file system has to be encrypted and transmitted again consuming a large amount of processing and data transmission. We still have that as a key to decipher the data is still on the mobile device, it may be that an attacker breaks the encryption of stored data.

In order to overcome the disadvantages of the prior art, the present invention proposes a system focused on the security of data stored in a cloud infrastructure, as well as secure data in transfer, using a secure bridge (HTTPS), that also protects data stored. Furthermore, the system of the present invention uses asymmetric keys stored on the device and in the cloud, to ensure that even in case of theft of the device or hard disks will not be possible to obtain the key, since only with the two together can be calculated the symmetric key and without it you, it is not possible to decipher data. Moreover, since the system is not intended for use by multiple users, this is only one user on different devices, it is not necessary cipher again the file system and retransmit it, thereby minimizing the data exchange.

To provide the online storage of information, the present invention uses cloud storage service.

SUMMARY OF THE INVENTION

The system presented suggests that the data stored in the cloud are encrypted and that their encryption keys are created on a device, whether portable, mobile or fixed, and stored in a divided party cloud storage and part of the device itself. Thus, it is possible to ensure that:

If the device is stolen, you cannot decipher the data, and
If the cloud storage is hacked, it will also be impossible to decipher the data.

Furthermore, the present invention proposes that files stored on-line will be divided into pieces (clusters) and that each cluster has its hash value calculated. In the context of the present description, hash (H) is a set of bytes of known small size, which is generated by mathematical operations, from large set of bytes (F) such that there are not two or more different Fs that generate a same H. In this context, comparing the computed hash values with those stored in the cloud, you can see which clusters have been modified. Using this information, we have only the clusters which have been modified will be trafficked, which, in turn, decreases the data transmission on the updated file system. In general, the system works as follows:

First, the system is booted. If the first run, the system will automatically generate the encryption keys, otherwise the keys that are stored in the cloud should be loaded into the system. Next, the symmetric key to be decrypted. From this key, the system goes to the main menu and is on standby. When a user interaction occurs, it will be checked if it was a written request for the file, otherwise the file is opened in read mode only. If a write request, there are three options: a) removing file, b) adding a new file or c) updating an existing file. After the operation, the system will return to the standby state. When the user wants to exit the system, as nothing was saved in the device, the memory used is released and all keys calculated and downloaded from the cloud will disappear from the device.

It will be used three pairs of asymmetric keys and a symmetric key by storing a portion of these keys in the cloud will always be necessary that the user is actually logged so that someone can decipher any information. Thus, to be able to decipher the data, it is necessary to have both keys stored on the device, as stored in the cloud storage. With this, the system is more secure because it ensures that even if the storage is compromised or the device is stolen, you cannot decrypt the data stored. This solution is independent of a specific cloud solution, or it can be configured to be used with any existing commercial solution such as, for example, DropBox, Evernotes or Amazon, not limited to those.

Using the hash of the files, we can transmit only what was changed, thus minimizing data transfer over the network.

By use a list containing the numbers of clusters for a particular file, it is not necessary that the clusters are sequential, making it more difficult for an attack can break the encryption. This can also lead to clusters that run out of the same file stored in different physical hard drives in the cloud, which increases safety.

BRIEF DESCRIPTION OF THE DRAWINGS

The objectives and advantages of the invention will become more apparent from the following detailed description of an exemplary embodiment of the invention and the accompanying drawings, by way of non-limitative example, wherein.

DESCRIPTION OF THE INVENTION

The following description is merely exemplary in nature and is not intended to limit the disclosure, application, or use.

Figure 1:
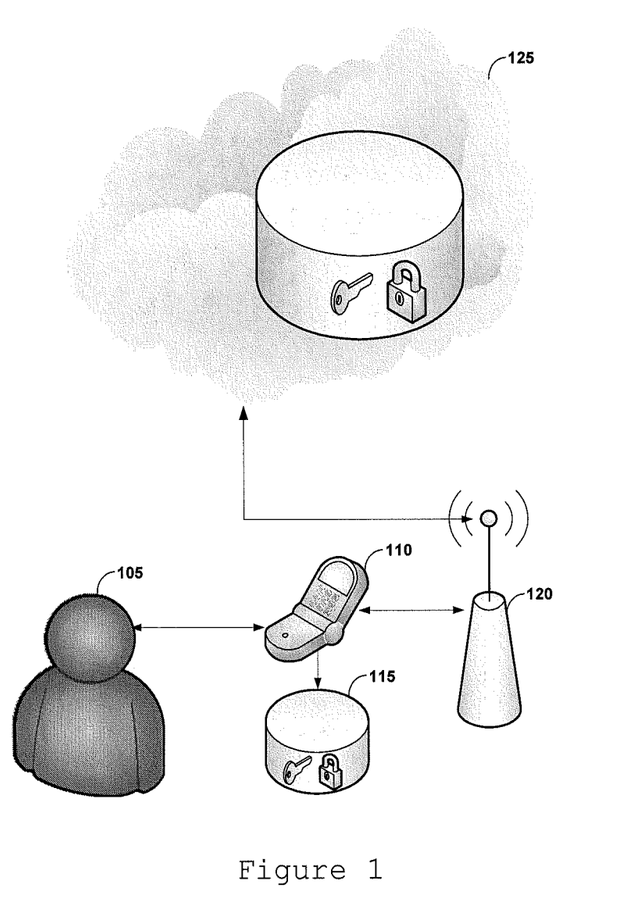
FIG. 1 gives an overview of the architecture of the secure storage system for distributed data.

With reference to FIG. 1, the overall system architecture is shown. To operate the system, first, it is necessary to boot the system. Then, the user 105 may interact with the system ordering it to open, add, modify or remove files from secure storage. For such operations to be performed, the user 105 necessarily need to be using a portable device 110 connected to the internet 120 with access to the cloud 125, in which the encrypted data is stored on the storage medium 115 of the device and in the cloud 125. The above storage medium may be any medium suitable for data storage such as a hard drive. All traffic between the device 110 and cloud 125 must be made using some method of secure data traffic, for instance the HTTPS protocol. Thus, the security of transmitted data is guaranteed against possible attacks aimed at capturing data sent.

Figure 2:
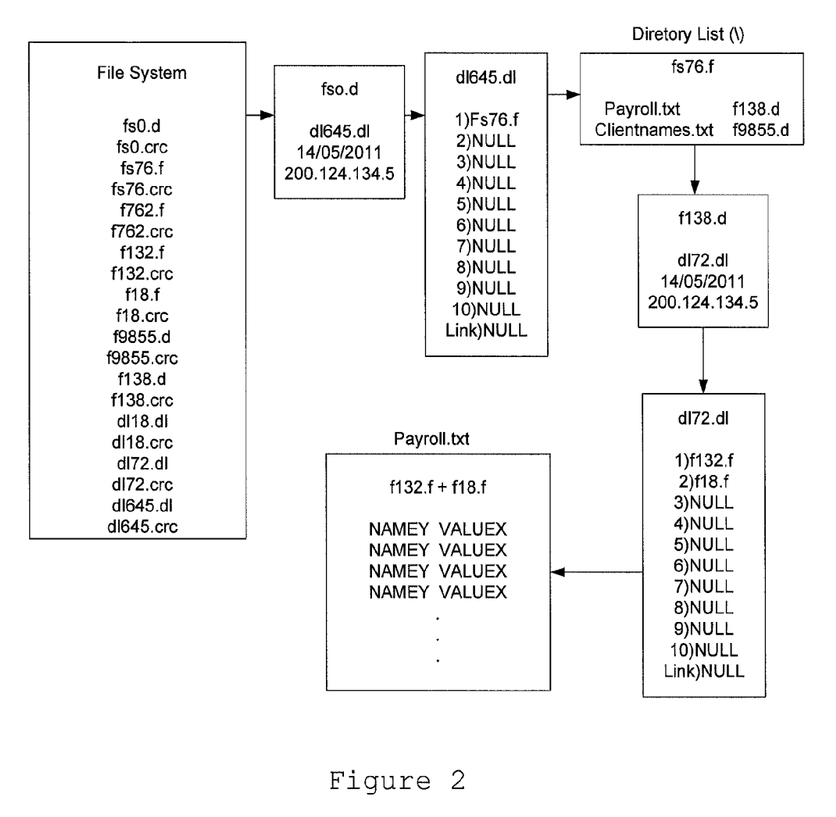
FIG. 2 shows the access to the file system according to the present invention.

FIG. 2 shows a system of files. The file system consists of extension files. ".f", ".crc", ".d", e ".dl", wherein:
- To file with extension ".f", they represent a file that contains a cluster of 256 KB. This cluster will contain the encrypted file with the standard padding of the prior art. These files can be part of a directory, in which case they will contain a list of files and children directories of the same descriptor.
- To file with extension ".crc", they represent the hash code from another file that has the same name, but with different extension.
- To files with extension ".d", these contain the descriptor for a particular file. This descriptor contains the first entry to the list of cluster comprising the file, the last modification date and the IP that made the last change.
- To file with extension ".dl", they contain a list. Within this list, ten addresses are stored cluster and the continuation of an address list, thereby forming a linked list.

All files and descriptors have created its set number randomly, thus ensuring that the clusters are not sequential. The descriptor for the root directory will always be the fs0.d, and it contains the necessary information to reach any file. In the example of FIG. 2, a schematic is presented step by step how a file is stored in the cloud. First, the descriptor is accessed fs0.d containing the list of clusters that forms the root file system (dl645.dl). Deciphering the root directory (fs76.f) gives the name and descriptor of the existing files. To open the file payroll.txt, we accessed the f138.d descriptor that contains the list of cluster comprising that file, and thus deciphered f132.f and f18.f, having access to the content of payroll.txt, which is ready to be used.

Figure 3:
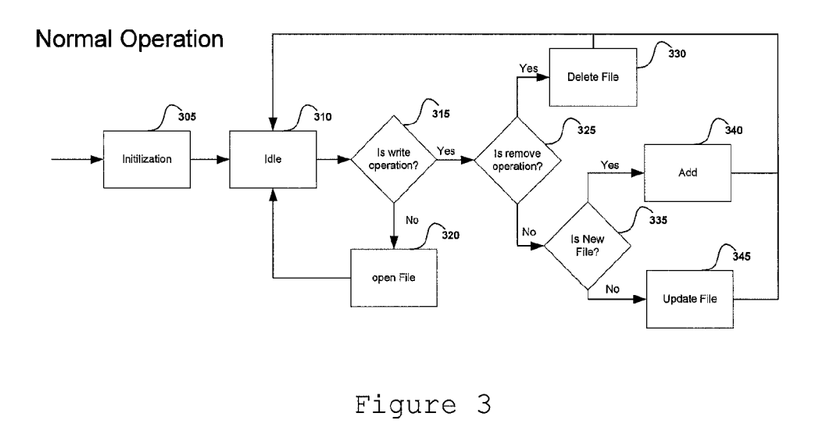
FIG. 3 shows the operation flow of the system according to the present invention.

FIG. 3 shows the flow of normal system operation. The first step is to initialize the system 305. After initialization, the symmetric key KS is in memory. After the system is waiting for some user interaction 310. When the user interacts with the system by asking some operation in some file, it is checked whether it was a write operation 315. If not, the file is opened 320. Otherwise, it is necessary to check which type of write operation was required. If it is a removal 325, the file is removed from the device and cloud 330. Otherwise, the requested operation is a modification, and therefore if the operation is in a new file 335, it should be added to the secure storage 340. Otherwise, the file must be modified both in the device and in the cloud 345.

Figure 4:
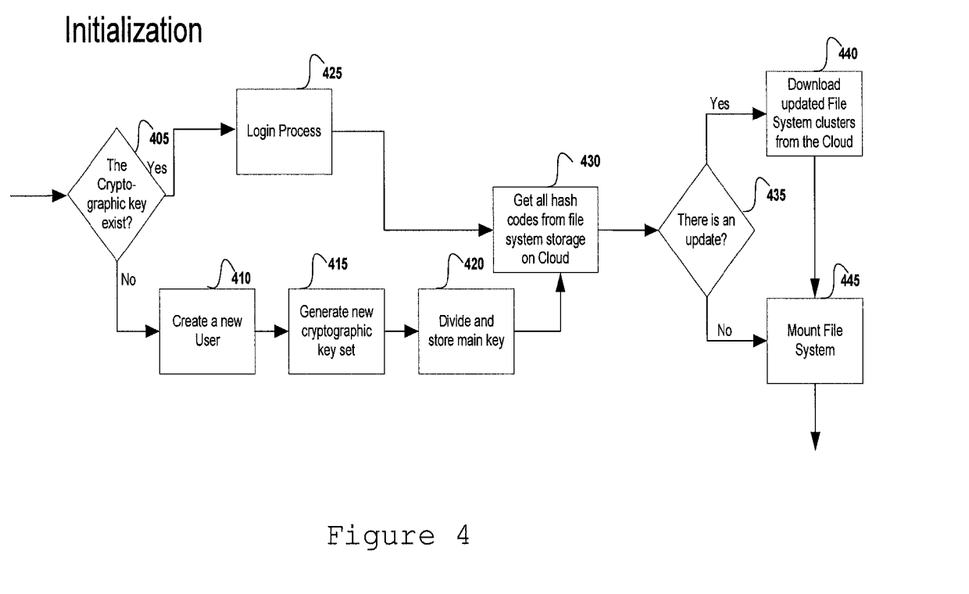
FIG. 4 shows the flow of initialization of the system according to the present invention.

As shown in FIG. 4, the flow initialization consists of verifying whether a user and their respective keys were created 405. If not, a new user should be created 410. If there is a user, it should log into his account 425.

Figure 5:
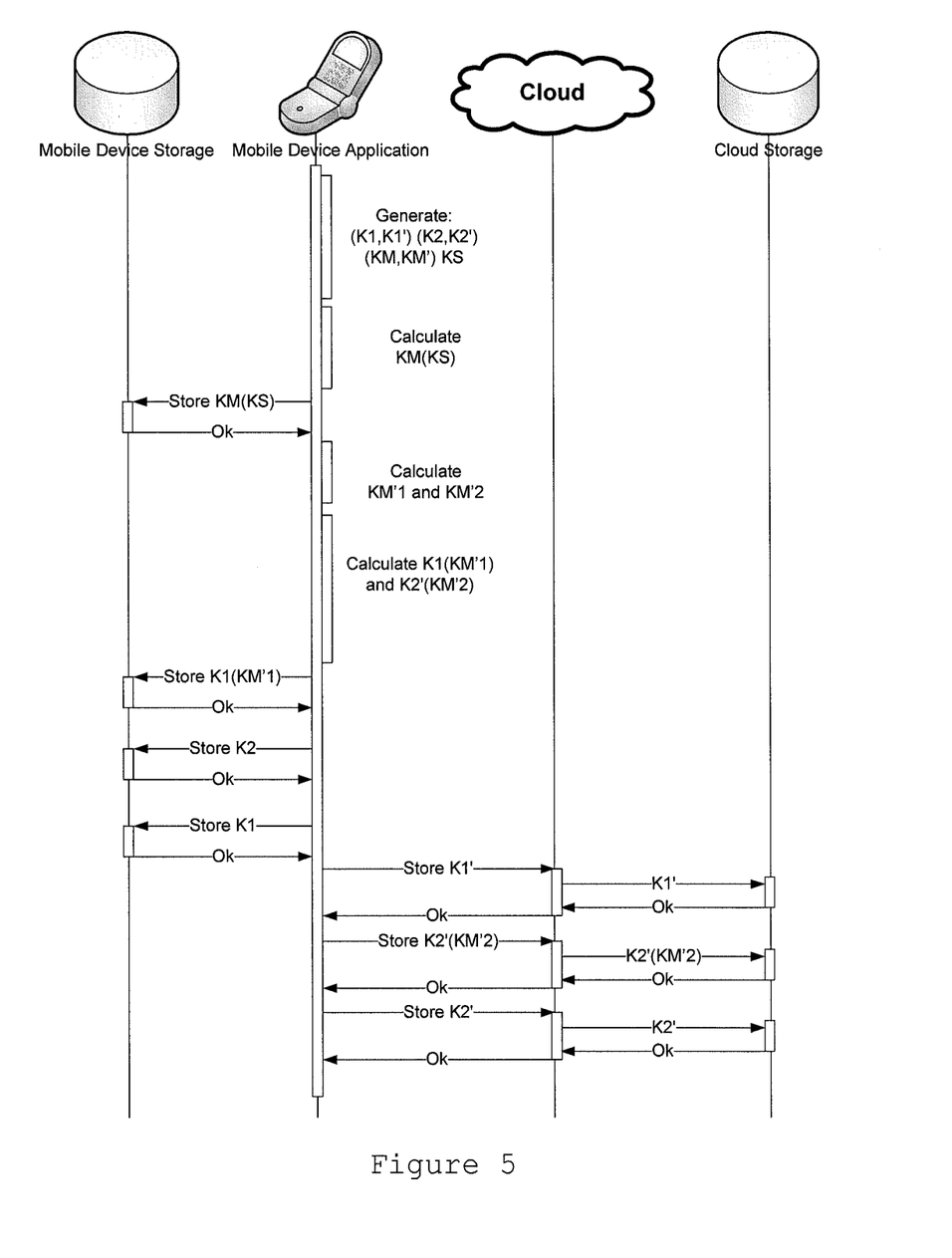
FIG. 5 shows the generation of the cryptographic key system according to the present invention.

FIG. 5 shows the process of generating cryptographic keys in the first access. More specifically, FIG. 5 details the initialization when the first access of a new user, wherein a set of cryptographic keys to be generated 415. Said set of keys consists of three pairs of asymmetric keys K1, K1', K2, K2', KM, KM' and a symmetric key KS, and KM' (KM (x))=x. According to the present invention, all data is encrypted with the storage key KS, wherein the symmetric key KS is encrypted using the asymmetric key KM. The asymmetric key KM' will be divided into two pieces and KM'1 KM'2. The piece of the asymmetric key KM'1 will be ciphered with the key K1 and will store it on the device. The piece of the asymmetric key KM'2 is ciphered with the key K2' and will store it in the cloud. The keys K1 and K2 will be kept on the device and keys K1' and K2' in the cloud (420), as shown in FIG. 5, thus ensuring that only someone that will have access to KM (KS) will have keys K1, K1' and K2, K2' and is connected with the service, or authenticated.

According to a preferred embodiment of the invention, a copy of the keys K1, K2, K1', K2', KM (KS), K1 (KM'1) and K2'(KM'2) should be stored in removable memory device (SD Card) and a warning to the user to save on a computer or on a flash drive that has different access the cloud should be issued.

Figure 6:
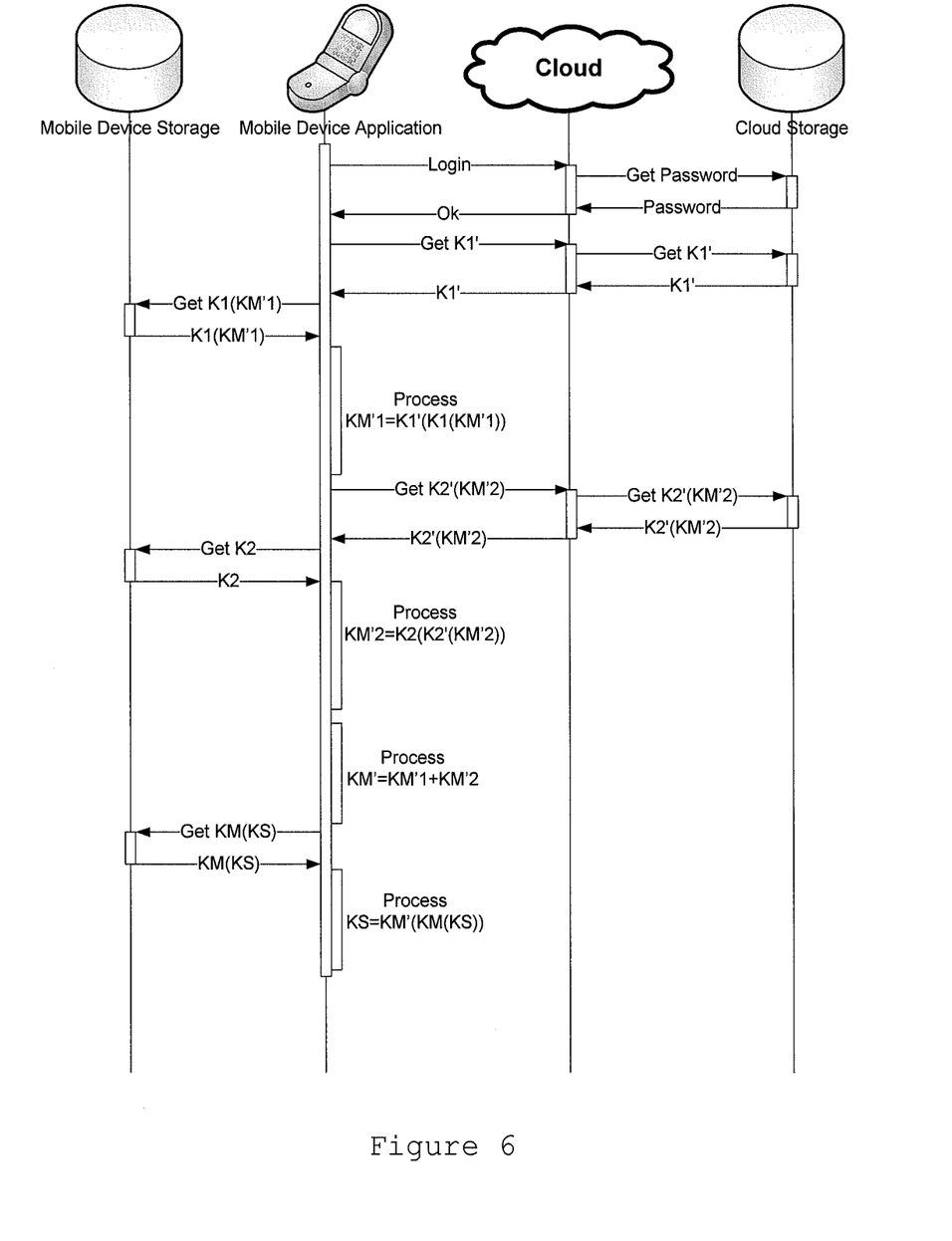
FIG. 6 shows the registration process in the system according to the present invention.

The registration process in the system illustrated in FIG. 6. First, the user must have their credentials checked by the provider of online storage. Then it will download the key K1'. Having K1 (KM'1) in memory, calculate K1"(K1 (KM'1)) that results in KM'1. The next step is to download K2'(KM'2) of online storage. Having key K2 in memory, it calculate K2 (K2'(KM'2)) that results in KM'2. With this, we can calculate KM'. With KM', we can calculate KM' (KM (KS)), resulting in symmetric key KS.

Once the user is registered, the system will check the file system changes. The hash clusters that comprise the file system must be loaded from the cloud 430, these hashes are used to verify that the copy is equal to the cloud and the device 435. If different packets of different file system 440 are downloaded and validated, then the file system is mounted (445).

Figure 7:
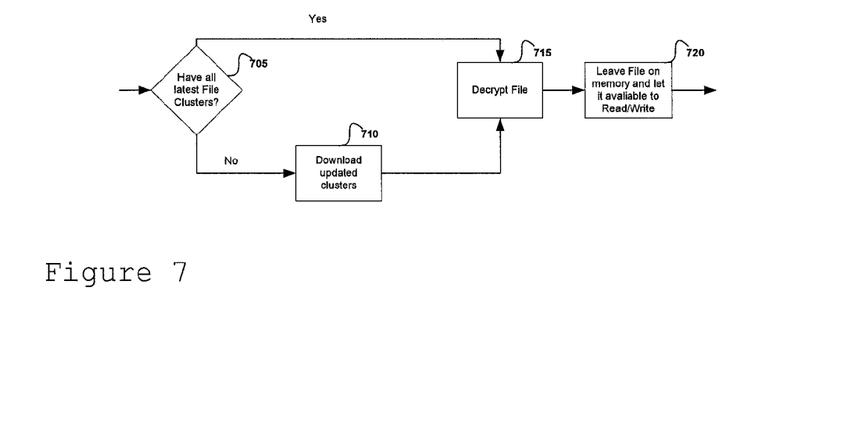
FIG. 7 shows the flow for opening a file system according to the present invention.

FIG. 7 shows the flow for opening a file. First, it is checked if the file is updated with the file from the cloud 705. If not, the different packages are downloaded 710, and the file is decrypted using the key KS 715. The file is decrypted in memory and it is possible to manipulate it or move it out of the safe area 720.

Figure 8:
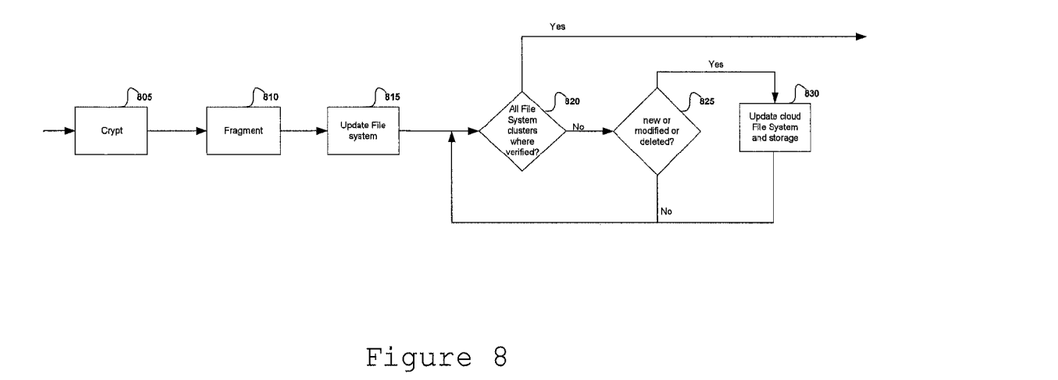
FIG. 8 shows the stream to modify a file system according to the present invention.

FIG. 8 shows the flow for modifying a file. First, the file should be encrypted 805. Then it must be divided into clusters and 810 clusters should have their hashes calculated. The file system must be further upgraded 815. For upgrading the cloud, it should be compared the hash codes of modified clusters. For this, we make sure that all clusters have undergone operations that were verified with cloud 820; otherwise, it is necessary to check if the next cluster was modified, whether it is new or if it does not exist 825. If so, the version should be updated in the cloud 830. It should be remembered that this process serves both as the file to the file system.

Figure 9:
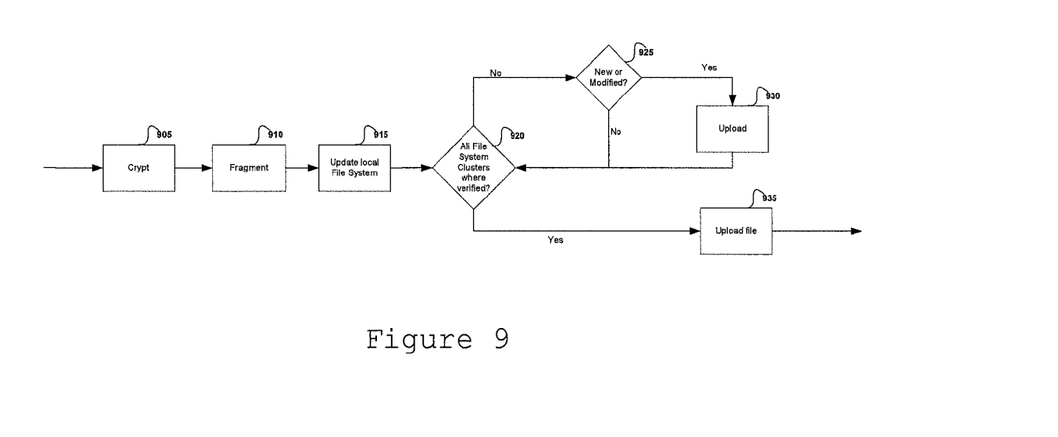
FIG. 9 shows the flow for adding a file system according to the present invention.

FIG. 9 details the flow to add a file. The file should be encrypted first 905, and then it should be broken into clusters 910. Clusters should have their hash codes calculated, and then the file should be added to the file system 915. This addition implies a modification in the files of the file system. For this, we make sure that all clusters have undergone operations that were verified with cloud 920. If not, it should be checked whether the next cluster file system has been modified or if it is new (925). If so, the version of the cluster in the cloud must be updated 930. When all clusters that represent the file system is checked, the new file will be copied to the cloud 935.

Figure 10:
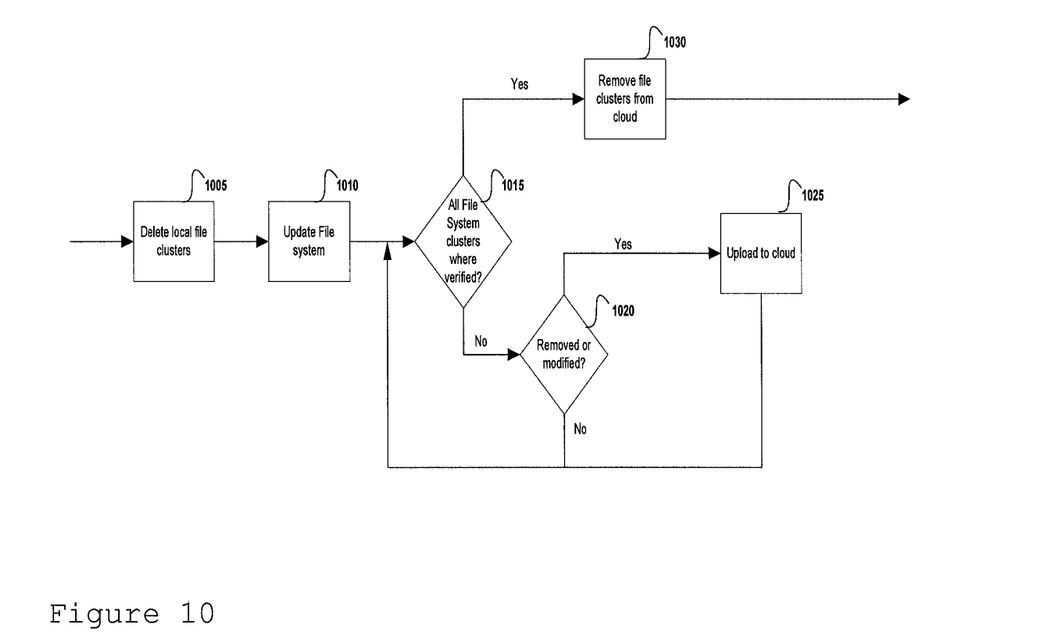
FIG. 10 shows the flow for deleting a file system according to the present invention.

FIG. 10 shows the flow to remove a file system. First, the file must have all pieces and hash codes erased 1005. Next, the file system must be upgraded 1010. This modification files in the file system implies an update in the cloud. For this, we make sure that all clusters have undergone operations that were verified with the cloud 1015. If not, you need to check if the next cluster file system has been modified or removed 1020. If so, the version should be updated in the cloud 1025. When all clusters that represent the file system is checked, the clusters that represent the file from the cloud will be removed 1030.

Although a preferred embodiment of the present invention is shown and described, those skilled in the art will understand that various modifications may be made without departing from the scope and spirit of the invention as defined in the appended claims.

It is also expressly stated that all combinations of elements which perform the same function in substantially the same way to achieve the same results are within the scope of the invention.

The invention claimed is:

1. A secure storage system for distributed data comprising:
a device comprising a non-transitory storage medium and connected to the Internet to access a distributed computing network (cloud),
wherein data stored in the cloud is encrypted using two symmetric keys, which are encrypted using three pairs of asymmetric keys, and
the asymmetric keys are created by the device and stored in a divided manner, such that a portion of each of the asymmetric keys is stored in the cloud and another portion is stored in the device itself,
wherein the encryption comprises:
using two symmetric keys that will encrypt the data;
using three pairs of asymmetric keys that will protect the symmetric keys;
encrypting both keys using the public asymmetric key of the first pair of asymmetric keys;
dividing the private asymmetric key of the first pair of asymmetric keys into two portions comprising a first portion and a second portion;
concatenating the first portion with the encrypted first symmetric key;
concatenating the second portion with the encrypted second symmetric key;
encrypting the first concatenated keys using the public asymmetric key of the second pair of asymmetric keys;
encrypting the second concatenated keys using the public asymmetric key of the third pair of asymmetric keys; and
storing the encrypted first concatenated key in the device and the encrypted second concatenated key in the cloud.

2. A secure storage system for distributed data comprising:
a device comprising a non-transitory storage medium and connected to the Internet to access a distributed computing network (cloud),
wherein data stored in the cloud is encrypted using two symmetric keys encrypted using each of three pairs of asymmetric keys, and
the keys are created by the device and stored in a divided manner, such that a portion of each of the keys is stored in the cloud and another portion is stored in the device itself,
wherein the three pairs of asymmetric keys comprise a first pair of asymmetric keys, a second pair of asymmetric keys, and a third pair of asymmetric keys, and
wherein the encryption comprises:
generating two symmetric keys;
generating the first pair of asymmetric keys comprising a first key and a second key;
encrypting both symmetric keys using the public (first key) asymmetric key of the first pair of asymmetric keys;
dividing the private (second key) asymmetric key of the first pair of asymmetric keys into two portions comprising a first portion and a second portion;
concatenating the first portion with the encrypted first symmetric key;
concatenating the second portion with the encrypted second symmetric key;
generating the second pair of asymmetric keys comprising a third key and a fourth key;
generating the third pair of asymmetric keys comprising a fifth key and a sixth key;
encrypting the first concatenated keys using the public (third key) asymmetric key of the second pair of asymmetric keys;
encrypting the second concatenated keys using the public (fifth key) asymmetric key of the third pair of asymmetric keys; and
storing the encrypted first concatenated key and the sixth key in the device and the encrypted second concatenated key and the fourth key in the cloud.

* * * * *

UNITED STATES PATENT AND TRADEMARK OFFICE
CERTIFICATE OF CORRECTION

PATENT NO.        : 9,135,464 B2
APPLICATION NO.   : 13/339068
DATED             : September 15, 2015
INVENTOR(S)       : Paulo Vitor Sato It is certified that error appears in the above-identified patent and that said Letters Patent is hereby corrected as shown below:

Title Page, First Column, (73) Assignee, Line 1

Delete "ELECTRÔNICA" and insert --ELETRÔNICA--, therefor.

Signed and Sealed this
First Day of December, 2015

Michelle K. Lee
*Director of the United States Patent and Trademark Office*